Sept. 8, 1964    G. W. MICHALEC    3,147,629
MULTITURN STOP

Filed July 6, 1961    10 Sheets-Sheet 1

INVENTOR.
GEORGE W. MICHALEC

BY *H. S. Mackey*

ATTORNEY.

INVENTOR.
GEORGE W. MICHALEC
BY
ATTORNEY.

_Fig-5_

_Fig-6_

_Fig-7_

_Fig-8_

_Fig-9_

_Fig-10_

_Fig-14_

_Fig-11_

_Fig-12_

INVENTOR.
GEORGE W. MICHALEC

BY

ATTORNEY.

Sept. 8, 1964        G. W. MICHALEC        3,147,629
MULTITURN STOP
Filed July 6, 1961        10 Sheets-Sheet 6

INVENTOR.
GEORGE W. MICHALEC
BY
ATTORNEY.

Sept. 8, 1964     G. W. MICHALEC     3,147,629
MULTITURN STOP Filed July 6, 1961                                        10 Sheets-Sheet 7

*INVENTOR.*
GEORGE W. MICHALEC

BY

ATTORNEY.

Sept. 8, 1964  G. W. MICHALEC  3,147,629
MULTITURN STOP
Filed July 6, 1961  10 Sheets-Sheet 8

INVENTOR.
GEORGE W. MICHALEC
BY
*H. S. Mackey*
ATTORNEY.

Sept. 8, 1964 G. W. MICHALEC 3,147,629
MULTITURN STOP
Filed July 6, 1961 10 Sheets-Sheet 9

INVENTOR.
GEORGE W. MICHALEC
BY
ATTORNEY.

Sept. 8, 1964    G. W. MICHALEC    3,147,629
MULTITURN STOP

Filed July 6, 1961    10 Sheets-Sheet 10

INVENTOR.
GEORGE W. MICHALEC

BY

ATTORNEY.

United States Patent Office 3,147,629
Patented Sept. 8, 1964

3,147,629
MULTITURN STOP
George W. Michalec, Pleasantville, N.Y., assignor to General Precision, Inc., a corporation of Delaware
Filed July 6, 1961, Ser. No. 122,271
22 Claims. (Cl. 74—10.2)

This invention relates generally to mechanical limit stop mechanisms and particularly to a multiturn stop mechanism which provides a large number of turns between positions of engagement while occupying but a small space.

The problem of providing mechanical stops for rotating shafts is often encountered in mechanical and electromechanical instrumentation. For example, delicate precision multiturn potentiometers can be damaged if driven into their internal light duty stops. Also, there are many other devices such as cams, mechanical function generators, etc., which have a limited rotational range and must be stopped before reaching their limiting positions. If but a few revolutions are to be accommodated between limiting positions, simple rotating dogs cooperating with mating stops may be sufficient. However, if a large number of revolutions such as fifty or more must be provided for, more complex arrangements are usually necessary.

A number of multiturn stops have been used in the past. For example, a number of washers, each with an extending ear, may be slipped over the rotating shaft. A lug fastened to the shaft engages the ear of the first washer after one turn, each washer engages the next on succeeding turns, and the final washer engages a fixed stop. While there is no actual limit to the number of washers that can be stacked, the axial length of the assembly becomes excessive when more than ten or twenty turns are required.

Another example is the combination of a screw thread with a travelling nut which engages limit stops at its extremes of travel. This arrangement also has considerable axial length when designed for a large number of turns.

Yet another example of prior art stops is an arrangement in which two gears of substantially equal diameter but having unequal numbers of teeth mesh with each other. Cams fastened to each gear are designed to pass by each other freely except at extreme positions of rotation where they engage. This arrangement, while compact in the axial direction, occupies a considerable area normal to the gear axes. Additionally, the design and fabrication of the complex cams makes such stops expensive.

Another kind of stop known in the past employs two meshing gears having unequal numbers of teeth. Each gear has a pin perpendicular to its face and a slotted link is slipped over the pins. The length of the slot is selected so that the gears rotate freely until the distance between pins tends to exceed the length of the slot, whereupon the gears are locked by the link. This kind of stop also occupies a large area normal to the gear axes.

It is apparent that the problem of providing for a large number of turns (fifty or more) between positive stops in a compact mechanism is not adequately satisfied by existing designs. Accordingly, it is a general object of the invention to provide an improved multiturn stop mechanism.

Another object is to provide a multiturn stop mechanism capable of accommodating a large number of turns between stops.

Another object is to provide a multiturn stop mechanism which is compact in both the axial and radial directions.

Another object is to provide a multiturn stop mechanism which may be added readily to existing gear trains.

Briefly stated, one embodiment of the invention comprises first and second gears mounted for independent rotation about a common axis and axially spaced a short distance. These gears are mechanically interconnected by auxiliary gearing, the various ratios being selected so that the first and second gears rotate at different rates. In the simplest form, the second gear may have one more tooth than the first while the auxiliary gearing may be a single pinion meshing with both. Each gear has a small protuberance or block fastened to that side which is adjacent to the other gear, the blocks being positioned at substantially equal radial distances from the common axis. A multilobed locking means such as a multifingered arm or a star wheel is pivoted about an axis parallel to the common axis and is so placed that one lobe always extends between the gears into the path of movement of the blocks. When the blocks are widely displaced circumferentially, rotation of the gears causes each block to engage a lobe of the locking means, push it out of the way, and pass by, at the same time bringing another lobe into the position just vacated by the first lobe. Each revolution of the gears brings the blocks closer together by one gear tooth space until a point is reached at which engagement of one lobe by the first block causes the next lobe to abut the second block, thereby providing a positive stop.

For a clearer understanding of the invention reference may be made to the following detailed description and the accompanying drawings, in which.

Figure 1:
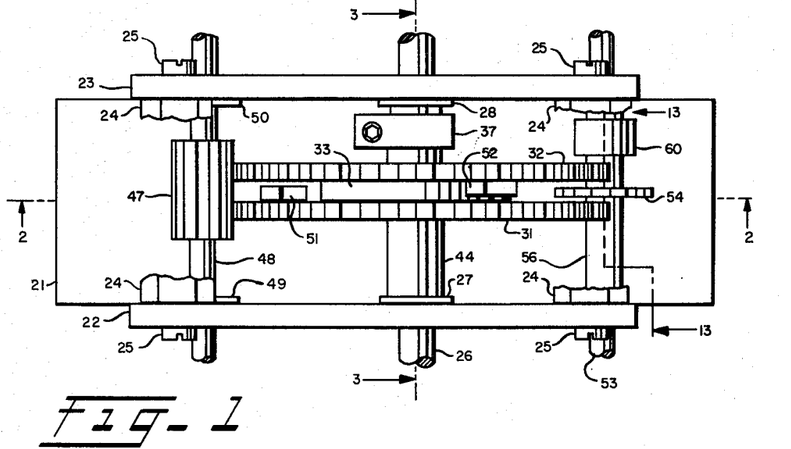
FIGURE 1 is a plan view of a preferred embodiment with some parts broken away.
Figure 2:
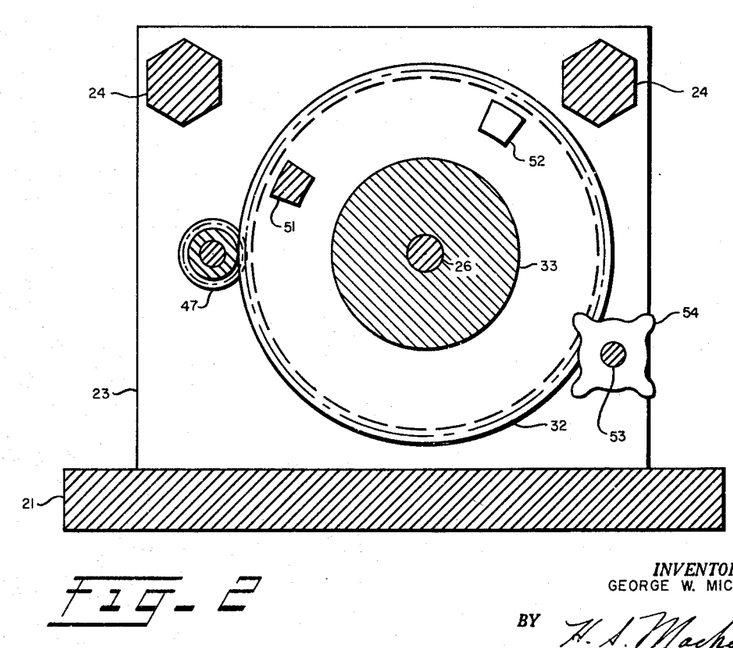
FIGURE 2 is a cross-section view taken on the line 2—2 of FIGURE 1.

Referring first to FIGURES 1 and 2, there is shown a base 21 to which are fastened two uprights 22 and 23 which support the apparatus. The top of the uprights 22 and 23 are held in place by two hexagonal spacers 24 fastened to the uprights 22 and 23 by means of four screws 25.

Figures 3, 4:
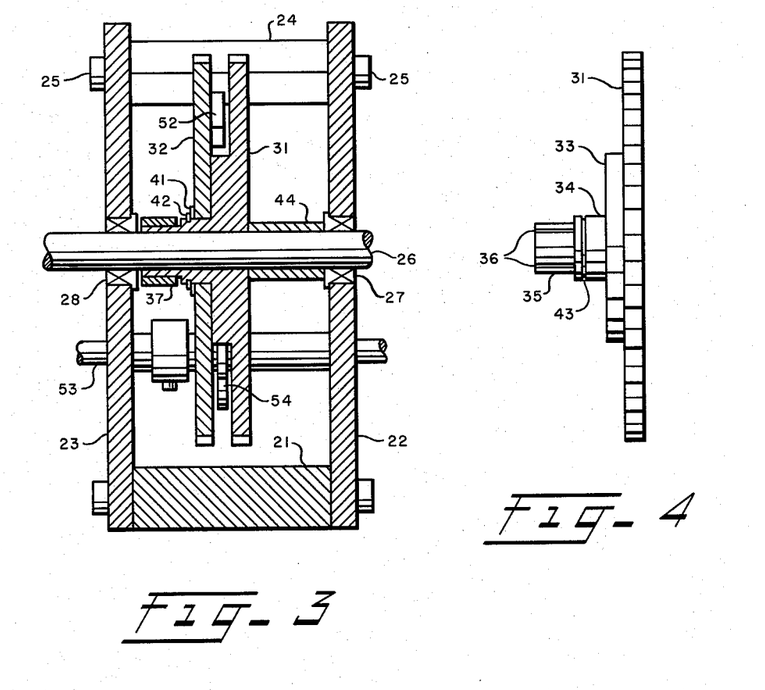
FIGURE 3 is a cross-section view taken on the line 3—3 of FIGURE 1.
FIGURE 4 is an elevation view of one of the gears.

A shaft 26 is supported by bearings 27 and 28 secured to the supports 22 and 23 respectively. Two gears 31 and 32 are carried by the shaft 26. As best shown in FIGURES 3 and 4, the gear 31 has three hubs, 33, 34 and 35, formed integrally therewith. The hub 35 has four radial slots 36, two of which are shown in FIGURE 4. A split collar 37 surrounding the hub 35 serves to clamp the gear 31 rigidly to the shaft 26. The gear 32 is freely rotatable about the hub 34 and is held in place by a washer 41 and a spring clip 42 which fits in a groove 43. The hub 33 establishes a space between the outer portions of the gears 31 and 32. A sleeve 44 spaces the gear 31 from the bearing 27.

The above described arrangement provides a mounting for the gears 31 and 32 by which they are spaced apart slightly and by which they are rotatable independently of each other about a common axis. Other arrangements which provide this kind of mounting might also be used, that described being preferred at present.

The gears 31 and 32 are mechanically interconnected by gearing so that if either gear is rotated the other will also rotate but at a slightly different rate. In the specific embodiment being described this gearing comprises, as best shown in FIGURE 1, a sixteen tooth pinion 47 meshing with gears 31 and 32 and fastened to a shaft 48 which in turn is carried by bearings 49 and 50 mounted on supports 22 and 23 respectively. Gear 31 has 120 teeth while gear 32 has 119 teeth, so that these gears rotate at slightly different rates.

As best shown in FIGURES 1 and 2, the gear 31 is provided with a small block 51 formed integrally with or fastened to that side of the gear 31 which faces the gear 32. For ease in manufacture, the block 51 may be a portion of a sector of a circle, as shown, bounded by arcs and radii, but its shape is not critical. The block 51 is mounted near the periphery of the gear 31 and its thickness is such that it extends toward but does not touch the gear 32. The gear 32 is provided with a similar block 52. Obviously, as the gears 31 and 32 rotate, the blocks 51 and 52 will change in relative position, one revolution of the gear 31 causing the blocks to approach or recede from each other by a circumferential distance equal to the circular pitch of the gears.

The apparatus so far described constitutes a multiturn stop. Continued rotation of the gear 31 in either direction would eventually cause the blocks 51 and 52 to abut each other, thus preventing further rotation. However, such a stop mechanism is not entirely satisfactory. Limit stops are usually designed to resist the input torque but in this case the blocks 51 and 52 would be required to resist a torque one hundred or more times the input torque, due to the differential gearing. Forces so generated could easily damage the parts unless they were of unusually sturdy construction. Additionally, the stopping position would not be clearly defined but would be a function of input torque. This is because the blocks 51 and 52 would engage each other slowly and because the mechanism would be subject to deflection. Accordingly, a positive stop mechanism is provided.

As shown in FIGURE 1, a shaft 53 is mounted on the supports 22 and 23, parallel to the shaft 26. A multilobed locking means is mounted to be rotatable about the shaft 53. As best shown in FIGURE 2, the locking means in the present embodiment comprises a star wheel 54 which has four teeth or lobes and which may be made from an eight toothed gear from which alternate teeth have been removed, leaving a four lobed locking star wheel. The shaft 53 and the wheel 54 are positioned so that no matter how the wheel 54 is rotated, one lobe always extends between the gears 31 and 32 into the path of movement of the blocks 51 and 52. The details of the mounting of the shaft 53 and the wheel 54 will be fully discussed subsequqently but for the present it is sufficient to note that the wheel 54 is rotatable about the shaft 53 and is positioned as above described and as shown in the drawing.

Figure 5:
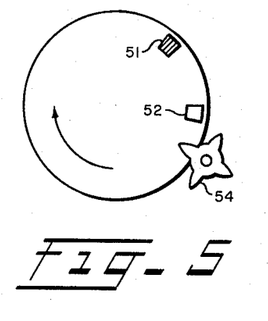
FIGURES 5–8 are schematic diagrams useful in explaining the operation of the invention.
Figure 6:
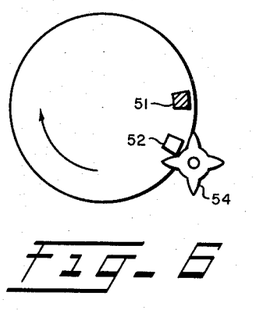
Figure 7:
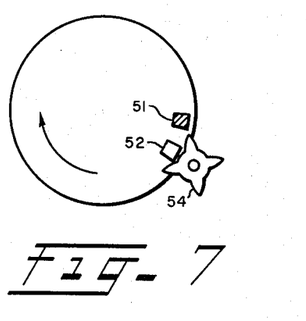
Figure 8:
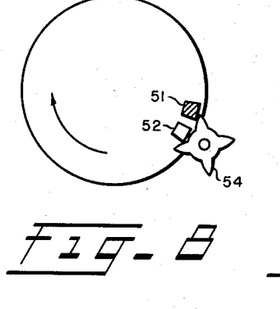

FIGURES 5-8 show the operation of the apparatus. In FIGURE 5, the block 52 is approaching the star wheel 54. In FIGURE 6, the block 52 is engaging one lobe of the star wheel 54 and is rotating the wheel as it passes by. The block 51 is a substantial distance behind and will engage the wheel in a similar manner and pass by. After a few revolutions the blocks 51 and 52 will be quite close together, FIGURE 7 showing the minimum separation which allows the blocks to pass by. One revolution later the blocks are so close together, as shown in FIGURE 8, that as the block 52 starts to push one lobe out of the way, the next lobe engages the block 51 and further rotation is prevented. The stopping action is positive since the star wheel presses upon the block 51 with the same force that the block 52 pushes the star wheel.

If the gears be rotated counterclockwise from the position shown in FIGURE 8, the blocks 51 and 52 will at first recede from each other and then approach each other from the opposite direction. Finally, lockup will again occur. The two positions establish the range in turns of the device. In the specific example being described there are approximately one hundred and five turns between stop or lockup positions.

There are a number of points which should be considered in designing the apparatus. First, the relative motion between the two gears must be of sufficient magnitude to allow adequate lockup bearing contact on the last turn, as shown in FIGURE 8, and also to provide adequate clearance on the next to last turn, as shown in FIGURE 7. Relative motion may be adjusted by selecting the gear ratio between the gears 31 and 32. The gears 31 and 32 may have the same or a different number of teeth, separate pinions may be used in place of the single pinion 47, or more complex gearing can be used. The limiting case is approached in the specific embodiment described wherein the difference in number of teeth is one and the pitch is very fine.

Figure 9:
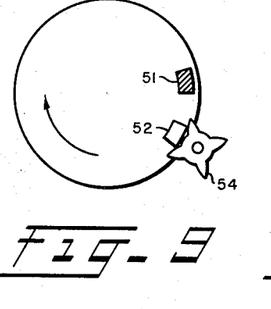
FIGURES 9–12 are schematic diagrams useful in explaining various design considerations.
Figure 10:
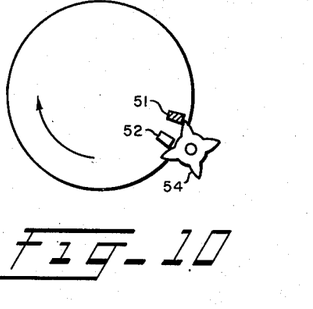
Figures 11, 14:
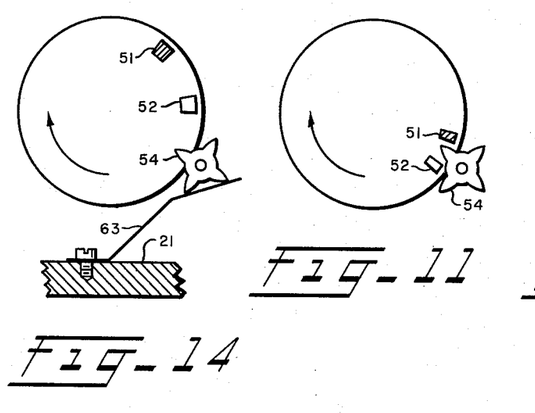
FIGURE 14 is a schematic diagram illustrating a modification of the star wheel mounting.

Second, it is important to correlate the width of the blocks 51 and 52 with the spacing between lobes of the star wheel 54. If the blocks are too wide they will not index the wheel freely, and may not index it at all, as shown in FIGURE 9. If the blocks are too narrow, excessive backlash may allow ambiguity of lockup. FIGURE 10 shows apparatus with narrow blocks in the lockup condition. However, a little jiggling may allow the block 52 to index through, as shown in FIGURE 11. In general, the width of the blocks relative to the size of and spacing between the lobes of the wheel should be such that the blocks pass through with a minimum of backlash.

Third, the thickness of the blocks must be correlated with the spacing between the gears 31 and 32 and the thickness of the lobes of the star wheel so that both blocks engage the star wheel. Each block could have a thickness less than half the spacing between adjacent sides of the two gears provided the star wheel were thick enough to bridge the space between them. As another alternative, two star wheels fastened together to rotate as a unit could be provided, one engaging each block, in which case the blocks could have any spacing between them or could be placed on opposite, rather than on adjacent, sides of the gears. However, at present the arrangement shown is preferred wherein the blocks are placed on adjacent sides of the gears and each is almost as thick as the spacing between the gears so that each engages the entire thickness of the lobes of a single star wheel.

Figure 12:
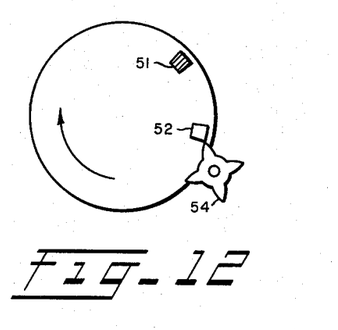

Fourth, some precautions should be taken to prevent unintentional lockup. When the star wheel is not being engaged by either block, it may assume any angular position. It may come to rest with one of the lobes in such position that, when the block approaches, the lobe will be engaged by the block so as to exert a force in the radial direction, as shown in FIGURE 12. No amount of input torque would allow the block to index the star wheel. This condition is a randomly occurring condition which arises occasionally unless precautions are taken.

Figure 13:
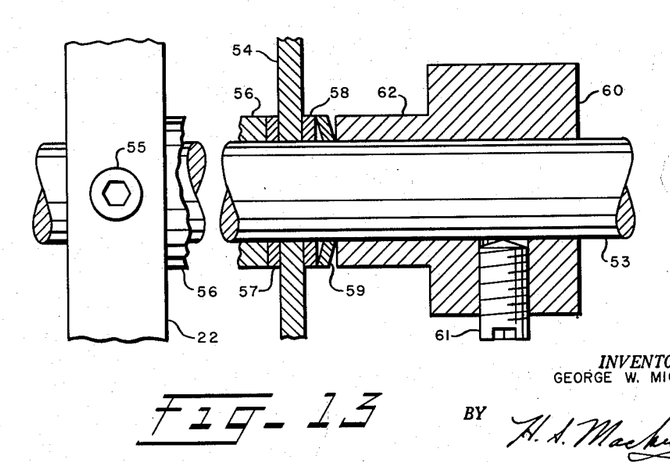
FIGURE 13 is an enlarged cross-section view taken on the line 13—13 of FIGURE 1 showing the details of the mounting of the star wheel.

There are at least three ways by which unintended lockup may be avoided. The first is that employed in the above described embodiment in which the star wheel is provided with friction to prevent coasting after indexing and to hold it in a fixed neutral position during the nonactive portion of the cycle. As best shown in FIGURE 13, the star wheel 54 is rotatable about the shaft 53 which, it will be recalled, is mounted on the supports 22 and 23. The shaft 53 is held in the supports 22 and 23 by set screws, one of which can be seen at 55 in FIGURE 13. A sleeve 56 serves to space the star wheel 54 from the support 22. Between the sleeve 56 and the star wheel 54 is a washer 57 which may be a simple steel washer but which is preferably made of a friction material such as sintered carbon in iron. A similar washer 58 is placed on the other side of the star wheel 54. Adjacent to the washer 58 is a spring which may be a helical spring or which, as shown, may be a bowed washer 59 made of resilient material such as beryllium copper. The washer 59 is made slightly cup or dish shaped so as to resist axial pressure resiliently. The amount of the bow is exaggerated in FIGURE 13 for clarity. To the right of the washer 59, as viewed in FIGURE 13, is a collar 60 provided with a set screw 61 for holding the collar 60 radially and axially on the shaft 53. The collar 60 has a reduced diameter sleeve portion 62 which abuts the spring washer 59.

The apparatus is assembled as shown and the collar 60 is pushed to the left so as to compress the spring waher 59 and the set screw 61 is tightened. The washers 57 and 58 provide friction so that rotation of the star wheel 54 is resisted but not prevented. Therefore, when the star wheel 54 is rotated by one of the blocks 51 and 52 there is no tendency for it to coast and it remains in proper position to be indexed when next one of the blocks approaches. The friction holds the star wheel so that vibration or other disturbances cannot move it to such a position that unintenional lockup can occur.

Another way to prevent unintentional lockup is shown in FIGURE 14. In this arrangement the friction washers are omitted and the star wheel 54 is freely rotatable about its supporting shaft. A small leaf spring 63 fastened to the base 21 bears against two lobes of the wheel 54 so as to maintain one lobe in optimum position when not engaged by one of the blocks 51 or 52. When a block engages one lobe of the star wheel 54 the spring 63 yields allowing the block to rotate the wheel and to pass by and then returns the wheel to the position shown.

Figure 15:
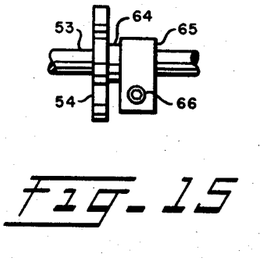
FIGURE 15 is a fragmentary elevation view of another modification of the star wheel mounting.

Yet another way to prevent unintentional lockup is by employing the force of gravity to urge the star wheel to the proper position, that is, away from that position at which unintentional lockup might occur. As shown in FIGURE 15, the star wheel 54 has a sleeve 64 fastened thereto or formed integrally therewith. Both are freely rotatable about the shaft 53. A split collar 65 surrounds the sleeve 64 and is fastened thereto by means of a set screw 66. When the star wheel 54 is not engaged by either of the blocks 51 or 52, the unbalance in weight caused by the excess length of the collar 65 in one direction and the set screw 66 is sufficient to urge the star wheel 54 to a neutral position when it can be engaged readily by the block 51 or 52.

Figure 16:
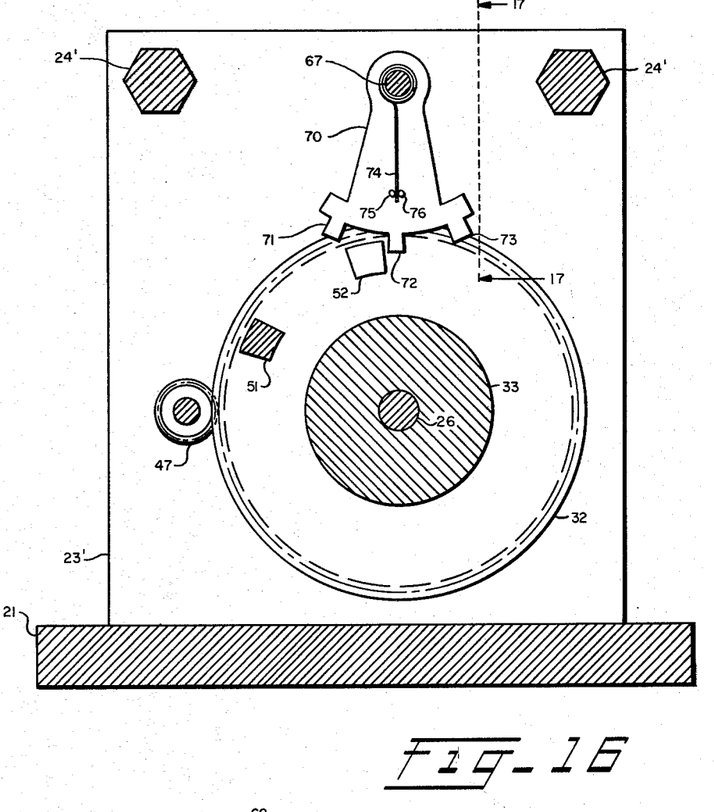
FIGURE 16 is a cross-section view, similar to FIGURE 2, showing a modified form of locking means which may be used instead of a star wheel.
Figure 17:
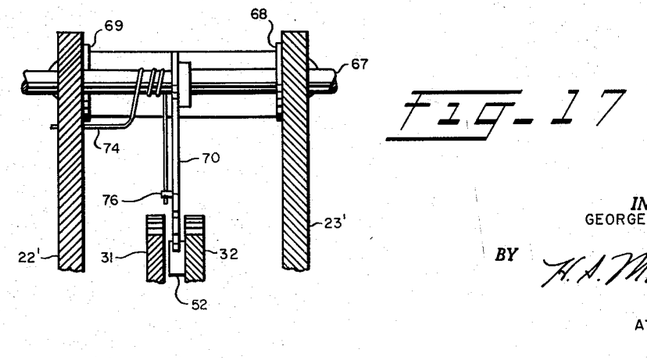
FIGURE 17 is a cross-section view taken on the line 17—17 of FIGURE 16.

Fifth, the locking means may take a variety of forms and have various numbers of lobes, the important thing being that as one lobe is displaced by the first block another takes its place. For example, the locking means need not be a complete wheel but may be a pivoted, multifingered arm. Such a locking mechanism is shown in FIGURES 16 and 17 wherein the uprights 22 and 23 are replaced by larger uprights 22' and 23' and the spacers 24 are replaced by spacers 24'. The shaft 53 and the star wheel 54 are replaced by a shaft 67 mounted in bearings 68 and 69 carried by the uprights 22' and 23'. Fastened to the shaft 67 is an arm 70 having three teeth, lobes or fingers 71, 72 and 73. These fingers extend between the gears 31 and 32 in much the same way as do the lobes of the star wheel 54. As best shown in FIGURE 17, a coil torsion spring 74 is slipped over the shaft 67. One end extends along the arm 70 and is held in place by two small pins 75 and 76, while the other end is bent parallel to the shaft 67 and passes through an aperture in the upright 22'.

Operation with the arm 70 is similar to that with the star wheel 54. As the gears rotate, the block 52 engages the central lobe 72 and pushes it out of the way while the lobe 71 enters the space between the gears 31 and 32. After the block 52 has passed by, the spring 74 returns the arm 70 to the position shown in the drawing, ready for the next block. When the blocks 51 and 52 are close together, the lobe 71 abuts the block 51, thereby providing a positive stop.

If the shaft 67 and arm 70 be mounted, as shown, directly above the shaft 26, the spring 74 may be omitted since the force of gravity will urge the arm to the position shown. However, by using the spring, orientation of the device is not critical and the arm 70 may be located at any position around the periphery of the gears 31 and 32.

The invention as so far described provides a single, fixed number of turns between lockup positions, which positions occur as the blocks 51 and 52 approach each other from opposite directions. A more flexible apparatus can be made by providing one of the gears with two blocks, the position of at least one of which is adjustable. Various mechanical configurations for making the stop adjustable can be used, one satisfactory arrangement being shown in FIGURES 18 and 19.

Figure 18:
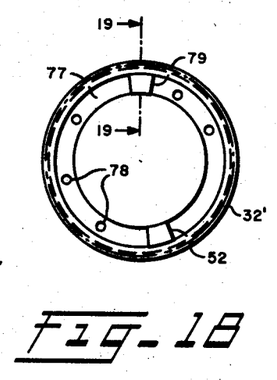
FIGURE 18 is an elevation view of a modified gear with two blocks mounted thereon.
Figure 19:
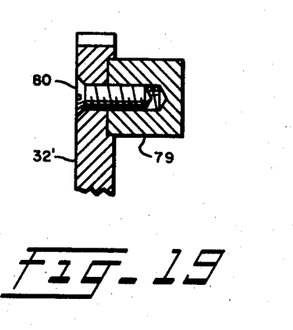
FIGURE 19 is a cross-section view taken on the line 19—19 of FIGURE 18.

In FIGURE 18 there is shown a modified gear 32' provided with the block 52 as before. Additionally, a shallow groove 77 is cut into the gear face having the proper width to engage the edges of a block. Several apertures 78 are provided around the gear in the center of the groove. As best shown in FIGURE 19, a second block 79 is positioned in the groove 77 and fastened by means of a machine screw 80. By selecting the appropriate aperture 78, various numbers of total turns capacity can be obtained.

Figure 20:
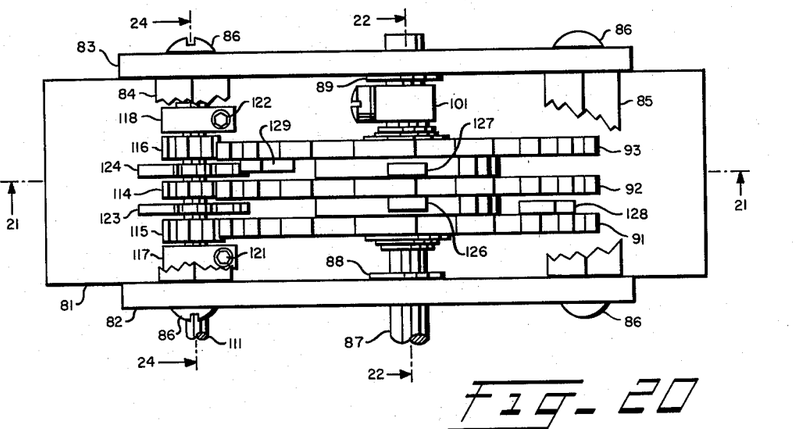
FIGURE 20 is a plan view, with certain parts broken away, of a modified form of the invention.
Figure 21:
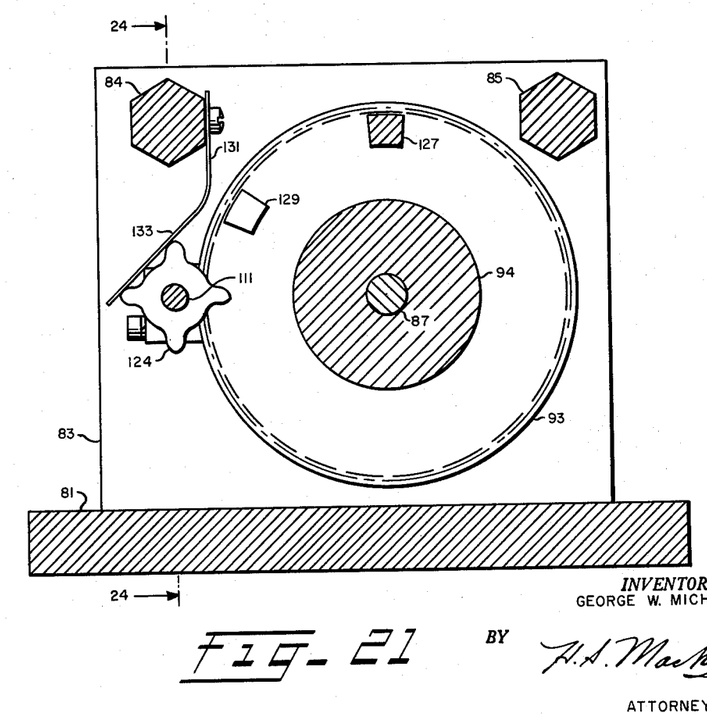
FIGURE 21 is a cross-section view taken on the line 21—21 of FIGURE 20.

A more flexible arrangement in which the turns capacity may be more readily and more accurately selected is shown in FIGURES 20 to 24. Referring now to FIGURES 20 and 21, there is shown a base 81 to which are fastened two uprights 82 and 83 which support the apparatus. The uprights 82 and 83 are held in spaced apart relation by the base 81 and by two hexagonal bars 84 and 85 fastened to the uprights 82 and 83 by four screws 86.

Figure 22:
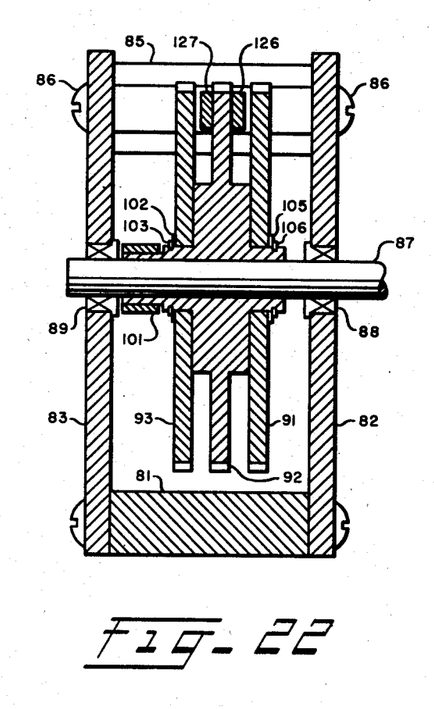
FIGURE 22 is a cross-section view taken on the line 22—22 of FIGURE 20.
Figure 23:
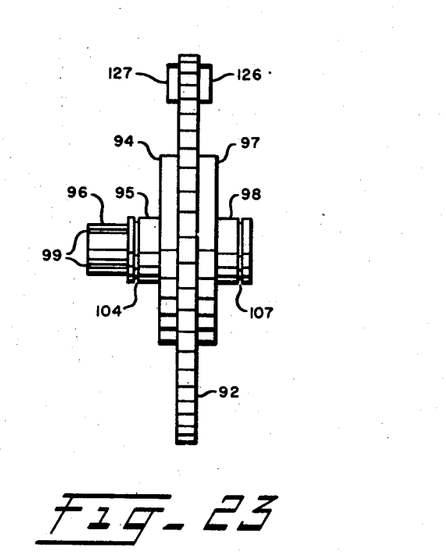
FIGURE 23 is an elevation view of one of the gears shown in FIGURE 22.

A shaft 87 is mounted for rotation in bearings 88 and 89 carried by uprights 82 and 83 respectively. Three gears 91, 92 and 93 are carried by the shaft 87. As best shown in FIGURES 22 and 23, the gear 92 has three hubs 94, 95 and 96 on one side and two hubs 97 and 98 on the other. The hub 96 has four radial slots 99 and is surrounded by a split collar 101 which clamps the gear 92 to the shaft 87. The gear 93 is freely rotatable about the hub 95 and is held in place by a washer 102 and a spring clip 103 which fits into a groove 104. Similarly, the gear 91 is freely rotatable about the hub 98 and is held in place by a washer 105 and a spring clip 106 which fits into a groove 107. The hubs 94 and 97 serve to space the gears 93 and 91 from the gear 92.

Figure 24:
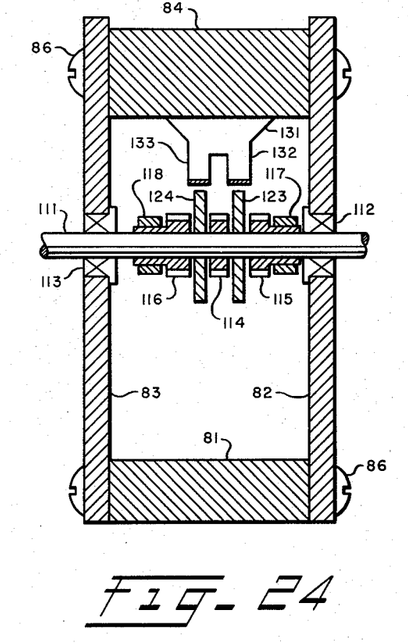
FIGURE 24 is a partial cross-section view taken on the line 24—24 of FIGURES 20 and 21, with many parts behind the section line omitted for clarity.

In the embodiment now being described the interconnecting gearing and the multilobed locking wheels are carried by a single shaft. As best shown in FIGURES 20 and 24, a shaft 111 is mounted parallel to shaft 87 in bearings 112 and 113 carried by the uprights 82 and 83. A pinion 114 is press fitted, soldered or otherwise permanently fastened to the shaft 111. Spaced on either side of the pinion 114 are pinions 115 and 116 clamped to the shaft 111 by split clamps 117 and 118 tightened by screws 121 and 122 respectively. A multilobed star wheel 123 is mounted to be freely rotatable about the shaft 111 between the pinions 114 and 115. Similarly mounted between the pinions 114 and 116 is a multilobed star wheel 124. The star wheels 123 and 124 may be identical to the star wheel 54 previously described.

The gears 91, 92 and 93, which normally would be visible in part behind the shaft 111, have been omitted from FIGURE 24 to enable the shaft 111 and the parts mounted thereon to stand out more clearly. However, it will be understood that the pinions 115, 114 and 116 mesh with the gears 91, 92 and 93 respectively, as shown in FIGURE 20. Rotation of either shaft 87 or shaft 111 obviously will cause all of the gears and pinions to rotate. The gear ratios are selected so that, with respect to the center gear 92, one of the outside gears 91 and 93 rotates slightly faster and the other slightly slower. For example, the gear 91 may have one hundred and nineteen teeth, the gear 92 may have one hundred and twenty teeth, the gear 93 may have one hundred and twenty-one teeth, and each of the pinions 114, 115 and 116 may have sixteen teeth.

As best shown in FIGURES 20 and 21, the gear 92 is provided with two blocks 126 and 127 formed integrally or otherwise securely fastened to opposite faces of the gear 92 near its periphery. The block 126 extends toward but does not touch the gear 91 while the block 127 extends toward but does not touch the gear 93. A similar block 128 is provided on that side of the gear 91 which faces the gear 92 and another block 129 is provided on that side of the gear 93 which faces the gear 92. As best shown in FIGURE 21, one lobe of the star wheel 124 extends into the path of movement of the blocks 127 and 129. Similarly, one lobe of the star wheel 123 extends into the path of movement of the blocks 126 and 128.

As best shown in FIGURES 21 and 24, the star wheels 123 and 124 are held in such position as to prevent unintentional lockup (as previously described) by means of a bifurcated leaf spring 131 fastened to the hexagonal bar 84. One fork 132 engages the star wheel 123 while the other fork 133 engages the star wheel 124 as shown in FIGURE 21. The spring 131 operates in the same way as the spring 63 previously described in connection with FIGURE 14.

Operation is similar to that previously described in connection with FIGURES 5–8. Rotation of either the shaft 87 or the shaft 111 causes the gears 91, 92 and 93 to rotate at slightly different rates. With respect to the gear 92, the gear 91, having one less tooth, will rotate faster while the gear 93, having one more tooth, will rotate slower. Accordingly, the blocks 128 and 129 will creep in opposite directions with respect to the blocks 126 and 127. When the blocks are far enough apart, each rotates its associated star wheel 123 or 124 and passes by. Lockup in one direction occurs when the blocks 126 and 128 approach each other too closely to pass by the star wheel 123. Lockup in the other direction of rotation occurs when the blocks 127 and 129 are too close to pass by the star wheel 124.

The number of turns between lockup positions is readily adjustable. Either or both of the clamps 117 and 118 may be released by loosening the screws 121 and 122 whereupon the relative positions of the blocks 128 and 129 with respect to the blocks 126 and 127 may be set as desired. In this way the number of turns between lockup positions can be adjusted from just under one turn to more than one hundred turns in increments of approximately one turn.

Figure 25:
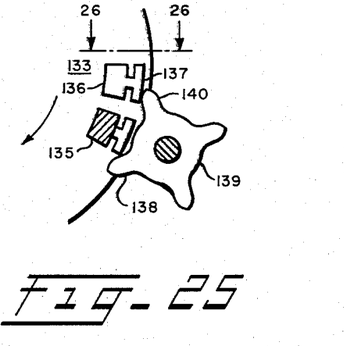
FIGURE 25 is a view, partly in section, showing a modified form of stop blocks.
Figure 26:
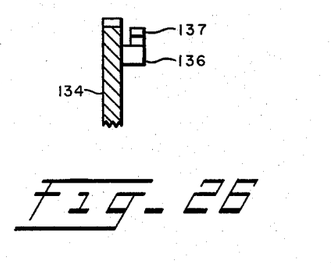
FIGURE 26 is a cross-section view taken on the line 26—26 of FIGURE 25.

FIGURES 25 and 26 illustrate a modified form of block which may be used in place of the blocks 51, 52, 126, etc., previously described. There is shown a block 133 fastened to a gear 134 and also a block 135 fastened to an adjacent gear (not shown). Each block, instead of being rectangular, has a base portion 136 and a T-shaped portion 137, the latter being spaced from the face of the gear 134 as shown in FIGURE 26. Illustrated in FIGURE 25 is the lockup condition. As the block 135 engages the lobe 138 of the star wheel 139, the lobe 140 of the star wheel engages the block 133. The T portions of the blocks deflect slightly, providing resiliency and absorbing some energy thereby decreasing the shock of the stopping action.

The embodiments previously described have a capacity between lockup positions of upwards of one hundred turns. A modification, to be fully described below, enables the turns capacity to be increased several fold. Essentially the modification comprises replacing a fixed stop or block with one which travels in a spiral groove cut into one of the gears so that it does not engage the corresponding fixed stop or block until several differential revolutions of the gears have occurred.

Figure 27:
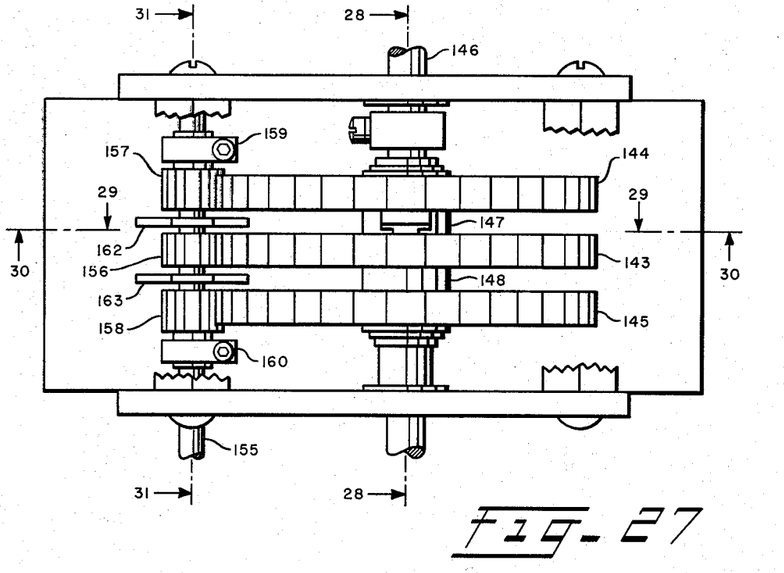
FIGURE 27 is a plan view, with some parts broken away, of a modified form of the invention.

Referring now to FIGURE 27, there is shown a three gear structure similar to that shown in FIGURE 20. A central gear 143 and two side gears 144 and 145 are arranged to be independently rotatable about the axis defined by a shaft 146. The mounting arrangement is similar to that of the embodiment previously described in connection with FIGURES 20–24 except that the hubs 147 and 148, which provide spacing between the gears, are of smaller diameter than the hubs 94 and 97 of the previously described embodiment. Additionally, each of the gears 143, 144 and 145 is preferably thicker than the corresponding gears of the previous embodiment.

Figure 28:
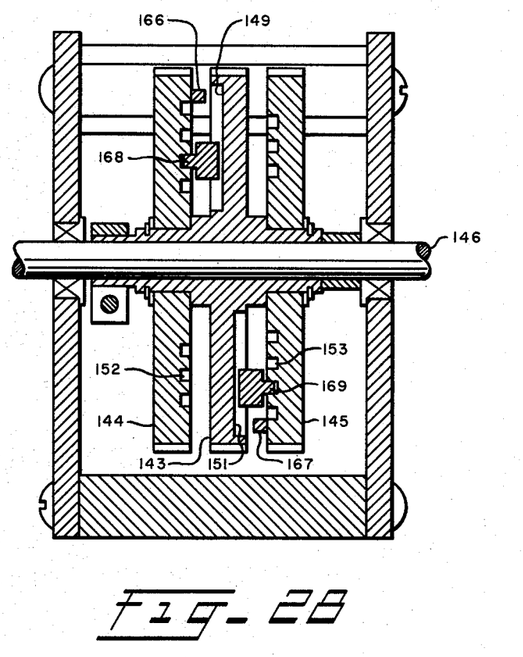
FIGURE 28 is a cross-section view taken on the line 28—28 of FIGURE 27.
Figure 29:
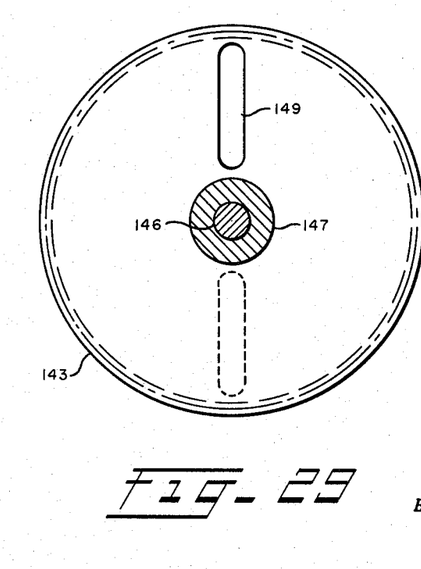
FIGURE 29 is a fragmentary cross-section view, taken on the line 29—29 of FIGURE 27.

As best shown in FIGURES 28 and 29, the central gear 143 has a radial slot or groove 149 formed in one side and another radial slot or groove 151 formed in the other side. It is preferable, but not essential, that the grooves 149 and 151 have a depth less than the gear thickness, as shown, and be formed at different angular positions (180° difference being shown) so as not to weaken the gear unduly.

The two side gears 144 and 145 may be identical. Each has the same number of teeth which number must be different from the number of teeth on the central gear 143. It is preferable that the number differ by one, for maximum capacity and for ease of mating with common or identical pinions. For example, if the central gear 143 has one hundred and twenty teeth, each side gear may have one hundred and nineteen teeth or each may have one hundred and twenty-one teeth.

Figure 30:
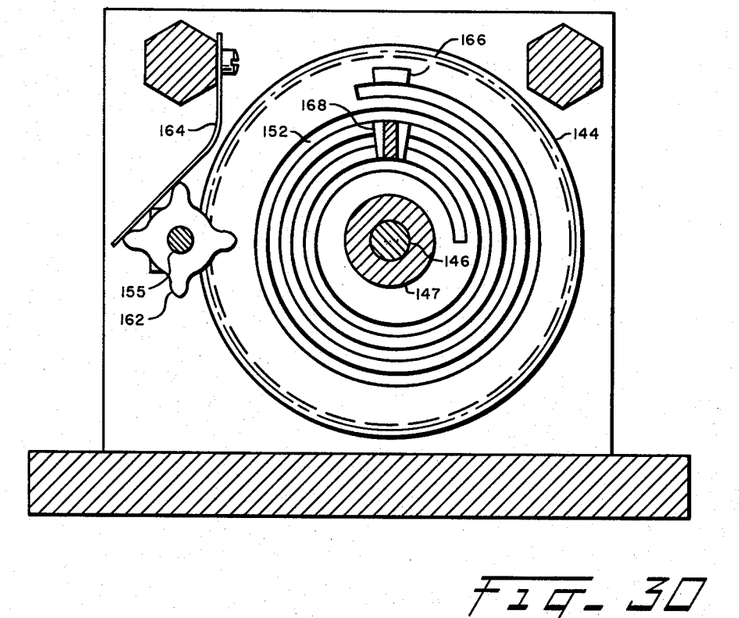
FIGURE 30 is a cross-section view taken on the line 30—30 of FIGURE 27.

As best shown in FIGURES 28 and 30, a spiral groove 152 is formed in that side of the gear 144 which is adjacent to the gear 143. As shown, the groove 152 is a bit more than three full turns in length. The gear 145 is identical to the gear 144 and has an identical groove 153 formed in that side which is adjacent to the gear 143. The grooves may spiral outward either clockwise or counterclockwise, provided both are the same.

Figure 31:
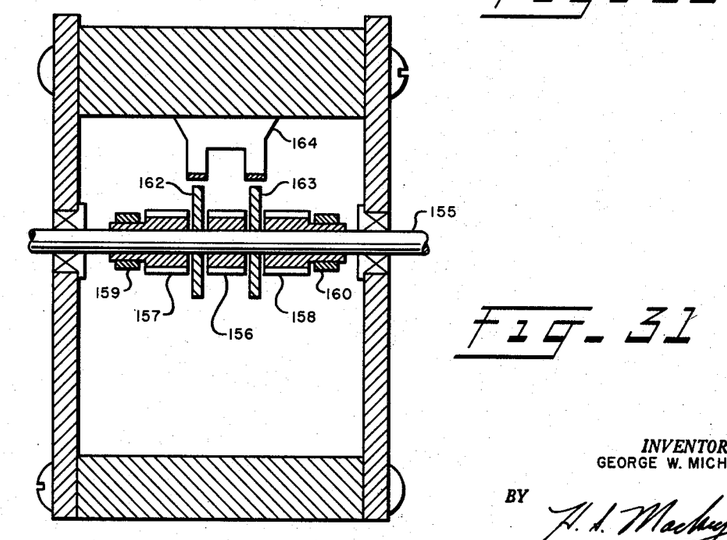
FIGURE 31 is a cross-section view taken on the line 31—31 of FIGURE 27, with many parts behind the section line omitted for clarity.

An auxiliary shaft 155 carries pinions, which mesh with the three gears, and star wheels as in the previously described embodiments. As best shown in FIGURE 31, a central pinion 156 is permanently fastened to the shaft 155 while pinions 157 and 158 are clamped thereto by means of clamps 159 and 160. The pinions 156, 157, and 158 will have the same number of teeth, for example, sixteen. The parts, such as the gears 143, 144 and 145 which would normally appear behind the pinions, have been omitted from FIGURE 31 in the interest of clarity. However, it will be understood that the pinions 156, 157 and 158 mesh with the gears 143, 144 and 145 respectively, as shown in FIGURE 27.

Between the pinions are star wheels 162 and 163 similar to the star wheels 54, 123 and 124, previously described, mounted to be freely rotatable about the shaft 155. A bifurcated spring 164 (FIGURES 30 and 31) normally holds the star wheels 162 and 163 in a predetermined position.

As best shown in FIGURES 28 and 30, a small stop or block 166 is fastened to or formed integrally with the gear 144 near the periphery just beyond the outer edge of the outermost turn of the groove 152. A similar block 167 is fastened in a corresponding position on the gear 145. When the device is assembled a travelling block 168 is positioned between the gears 143 and 144 and a similar block 169 is placed between the gears 143 and 145.

Figures 32, 33, 34:
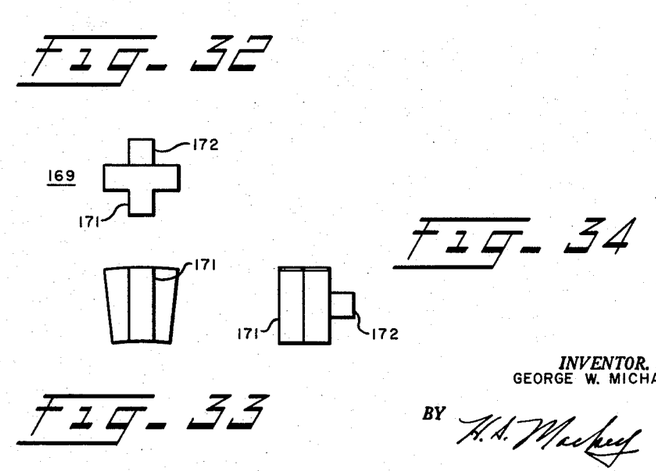
FIGURE 32 is an enlarged plan view of one of the blocks shown in FIGURE 28.
FIGURE 33 is an enlarged front elevation view of the same block.
FIGURE 34 is an enlarged side elevation view of the same block.

As shown enlarged in FIGURES 32, 33 and 34, the block 169 includes a projection 171 for mating with the groove 151 and a projection 172 for mating with the groove 153. The top and bottom, as shown in FIGURE 33, may be slightly arcuate in shape. The dimensions are selected so that the body of the block fits between the gears and the projections fit the grooves without binding.

In operation, rotation of either the shaft 146 or the shaft 155 will cause the gears 143, 144 and 145 to rotate in the same direction. The gears 144 and 145 rotate at the same speed, both gears rotating faster or slower than gear 143 depending upon whether gear 143 has one less or one more tooth than the gears 144 and 145. As the gear 143 rotates, blocks 168 and 169 necessarily rotate with it. But since the gears 144 and 145 rotate at a speed different from that of the gear 143, the blocks 168 and 169 travel along the spiral grooves 152 and 153. The gears 144 and 145 and their grooves 152 and 153 are identical, but since the grooves face each other they are in effect of opposite hand as viewed from the same direction. Therefore as block 168 travels outward, the block 169 travels inward, and vice-versa. After upwards of one hundred turns (approximately one hundred and twenty turns in the specific embodiment being described) the blocks 168 and 169 will be in approximately the same angular position as before but radially displaced by one turn of the spiral grooves. Lockup occurs when either of the blocks 168 or 169 reaches the outer turn of its spiral slot and approaches the fixed block 166 or 167, as the case may be, so closely that the two blocks cannot pass by the star wheel. The actual locking operation occurs as previously explained in connection with FIGURE 8.

In order to obtain the maximum turns capacity the apparatus should be set up with the block 168 adjacent to the block 166 so as to be locked by the star wheel 162. At this time the block 169 should be at the inner extreme of its spiral groove 153. Then, as the gears rotate, the block 168 will move inward while the block 169 will move outward, and each will travel the maximum distance before the block 169 and the block 167 approach each other closely enough to cause lockup at the opposite extreme position.

The relative positions of the two travelling blocks 168 and 169, and consequently the turns capacity, may be readily adjusted. One or both of the clamps 159 and 160 (FIGURES 27 and 31) may be loosened whereupon the gears 144 or 145 or both may be rotated until the blocks 168 and 169 are in the desired positions. The capacity may be adjusted to be anything from less than one turn to more than three hundred turns. Obviously the capacity could be increased by increasing the length of the spiral grooves.

Although the device of FIGURES 27–34 has been described as employing two identical gears 144 and 145, it is obvious that the same result could be achieved with unlike gears.

For example, the proper relative rotation of the gears may be obtained by suitably selecting the number of teeth of the gears 143, 144 and 145 and the pinions 156, 157 and 158, as suggested in connection with the previously described embodiments. As another example, the gear 144 may have a groove 152 which spirals outward counterclockwise, as shown, while the gear 145 may have a groove which spirals outward clockwise, provided that the two gears rotate in opposite directions. This is readily accomplished by making one of the gears 144 or 145 with more teeth than the gear 143 and the other with fewer teeth. For example, if the gear 143 has one hundred and twenty teeth, the gear 144 may have one hundred and nineteen teeth while the gear 145 has one hundred and twenty-one teeth. With this arrangement the blocks 168 and 169 will travel in opposite radial directions as before.

Figure 35:
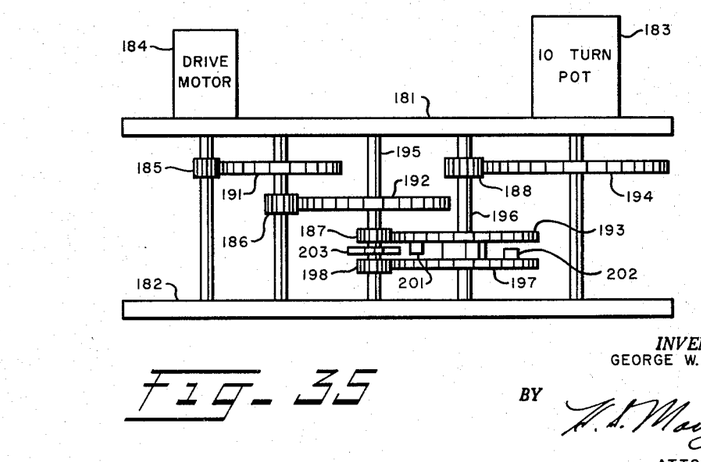
FIGURE 35 is a plan view, partly schematic showing how a stop mechanism in accordance with the present invention may be incorporated into a gear train.

FIGURE 35 shows schematically how a stop mechanism in accordance with the present invention may be incorporated into a gear train. There are shown a pair of frame members 181 and 182 on which are mounted an instrument such as a ten turn potentiometer 183 which is to be rotated by a motor 184. The motor 184 drives the potentiometer 183 through a conventional gear train comprising pinions 185, 186, 187 and 188 and gears 191, 192, 193, and 194. The stop mechanism utilizes the existing pinion 187 and gear 193 and their shafts 195 and 196. In addition, the stop mechanism comprises essentially a gear 197 having a slightly different number of teeth freely rotatable about the shaft 196, a pinion 198 identical to the pinion 187 fastened to the shaft 195, blocks 201 and 202 fastened to the gears 193 and 197, and a star wheel 203 rotatable about the shaft 195. It is obvious that only a small additional space is required in order to include a stop mechanism within the gear train.

Although several specific embodiments have been described in considerable detail, many modifications can be made within the spirit of the invention. It is therefore desired that the protection afforded by Letters Patent be limited only by the true scope of the appended claims.

What is claimed is:

1. A multiturn stop, comprising, a first and second gears mounted on a common axis, first and second blocks mounted to rotate with said first and second gears respectively, means mechanically interconnecting said gears to rotate in the same direction at different rates, whereby the positions of said blocks with respect to each other vary as said gears rotate, and means cooperating with said blocks for preventing rotation of said gears when said blocks reach a predetermined relative position.

2. Apparatus according to claim 1 in which said last named means comprises rotatably mounted multilobed locking means the lobes of which are displaced periodically by engagement with said blocks until said blocks reach a limiting position at which further displacement is prevented.

3. A multiturn stop, comprising, first and second gears mounted for independent rotation about a common axis, gear means mechanically interconnecting said first and second gears with a gear ratio different from unity, first and second blocks mounted for rotation with said first and second gears respectively, and multilobed locking means pivotally mounted about an axis parallel to said common axis and displaced therefrom beyond the periphery of each of said first and second gears, said locking means having a plurality of lobes axially positioned and of such radius that, upon rotation of said locking means, said lobes extend into the paths of movement of said blocks as said blocks and gears rotate.

4. A multiturn stop, comprising, first and second gears axially spaced apart and mounted for independent rotation about a common axis, gear means mechanically interconnecting said first and second gears with a gear ratio different from unity, first and second blocks mounted for rotation with said first and second gears respectively and positioned on that side of each gear which is adjacent to the other, said blocks each extending toward but not touching the other gear, and a multilobed star wheel mounted for rotation about an axis parallel to said common axis and displaced therefrom beyond the periphery of each of said first and second gears, said star wheel being axially positioned between said first and second gears and each lobe having such a radius that it extends into a portion of the path of movement of each of said blocks as said first and second gears rotate.

5. A multiturn stop, comprising, first and second gears mounted for independent rotation about a common axis, gear means mechanically interconnecting said first and second gears with a gear ratio such that rotation of said first gear causes said second gear to rotate at a different rate, first and second blocks mounted on sides of said first and second gears respectively at substantially the same distance from said common axis, said blocks extending outward from said sides of said gears in a direction parallel to said common axis, and multilobed locking means pivotally mounted on an axis parallel to said common axis and displaced therefrom by a distance greater than the radius of either of said first or second gears, said locking means having a plurality of lobes axially positioned and of such radius that said lobes extend into the paths of movement of said blocks as said blocks and gears rotate.

6. A multiturn stop, comprising, first and second gears mounted for independent rotation about a common axis, gear means mechanically interconnecting said first and second gears with a gear ratio such that rotation of said first gear causes said second gear to rotate at a different speed, first and second blocks mounted on sides of said first and second gears, respectively, at substantially the same radial distance from said common axis, said blocks extending from said sides of said gears in axial directions, multilobed locking means mounted for rotation about an axis parallel to said common axis and displaced therefrom by a distance greater than the radius of either of said first or second gears, said locking means having a plurality of lobes so axially positioned and of such radius that, upon rotation of said locking means, said lobes extend into the path of movement of said blocks as said blocks and gears rotate, and means for resisting but not preventing rotation of said locking means.

7. A multiturn stop, comprising, first and second gears of substantially the same diameter mounted for rotation independently of each other about a common axis, said gears having different numbers of teeth, toothed pinion means rotatable as a unit and having the same number of teeth meshing with each of said first and second gears, first and second blocks mounted on sides of said first and second gears, respectively, at substantially the same distance from said common axis, said blocks extending from said sides of said gears in directions parallel to said common axis, multilobed locking means pivotally mounted on an axis parallel to said common axis and displaced therefrom by a distance greater than the radius of said first and second gears, said locking means having a plurality of lobes so axially positioned and of such radius that said lobes extend into the paths of movement of said blocks, and means for resisting but not preventing rotation of said locking means.

8. A multiturn stop, comprising, first and second gears of substantially the same diameter mounted for rotation independently of each other about a common axis, said gears being axially spaced apart and having numbers of teeth differing by one, toothed pinion means rotatable as a unit and having the same number of teeth meshing with each of said first and second gears, first and second blocks positioned between adjacent sides of said gears and rotatable with said first and second gears, respectively, a multilobed star wheel mounted for rotation about an axis parallel to said common axis and displaced therefrom by a distance greater than the radius of said gears, said star wheel being so axially positioned and the lobes thereof being of such radius that said lobes extend between said gears into a portion of the paths of movement of said blocks, and means for resisting but not preventing rotation of said star wheel.

9. A multiturn stop, comprising, first and second gears axially spaced apart and mounted to be rotatable independently of each other about a common axis, gear means mechanically interconnecting said first and second gears, the gear ratios among said gear means and said first and second gears being selected so that rotation of said first gear causes said second gear to rotate at a different rate, a multilobed star wheel mounted for rotation about an axis parallel to said common axis and displaced therefrom by a distance greater than the radius of either said first or second gears, said star wheel being so axially positioned and the lobes thereof being of such radius that said lobes extend between adjacent sides of said first and second gears, first and second blocks fastened to said first and second gears, respectively, on that side of each which is adjacent to the other, each of said blocks being positioned at substantially the same radial distance from said common axis, the axial distance between said blocks being less than the thickness of said lobes of said star wheel, the radial distance of said blocks from said common axis and the radius of said lobes being selected so that the paths of movement of said blocks and said lobes intersect, and means for resisting but not preventing rotation of said star wheel.

10. A multiturn stop, comprising, a first shaft, a first gear fastened to and rotatable with said first shaft, a second gear having substantially the same diameter as said first gear and mounted to be freely rotatable about said first shaft, said gears being axially spaced apart, said first and second gears having numbers of teeth differing by one, a second shaft, toothed gear means fastened to said second shaft and having the same number of teeth engaging each of said first and second gears, first and second blocks fastened to said first and second gears respectively on that side of each gear which is adjacent to the other, said blocks being at substantially the same radial distance from said first shaft, said first block extending toward but not touching said second gear, said second block extending toward but not touching said first gear, each block extending more than one-half the distance between adjacent sides of said gears, a multilobed star wheel mounted for rotation about an axis parallel to said first shaft and displaced therefrom a distance greater than the radius of said first and second gears, said star wheel being axially positioned between said first and second gears and each lobe having such radius that it intersects the paths of movement of each of said blocks as said blocks rotate with said first and second gears, and means for resisting but not preventing angular movement of said star wheel.

11. A multiturn stop, comprising, a first gear, two auxiliary gears axially spaced apart from and positioned on opposite sides of said first gear, all of said gears being of substantially the same diameter and being mounted for independent rotation about a common axis, a shaft parallel to and displaced from said common axis by a distance greater than the radius of said gears, a first pinion fastened to said shaft and meshing with said first gear, two auxiliary pinions fastened to said shaft each meshing with one of said auxiliary gears, one of said auxiliary pinions being releasably fastened to said shaft whereby the angular position of one of said auxiliary gears with respect to the other auxiliary gear and said first gear may be adjusted, the ratio among said gears and said pinions being selected so that said first gear rotates at a rate different from that of either of said auxiliary gears, first and second blocks positioned between said first gear and one of said auxiliary gears and rotatable with said first gear and said one auxiliary gear respectively, third and fourth blocks positioned between adjacent sides of said first gear and the other of said auxiliary gears and rotatable with said first gear and said other auxiliary gear respectively, two multilobed locking mechanisms each rotatably mounted on an axis parallel to but displaced from said common axis by a distance greater than the radius of said gears, each of said locking mechanisms having a plurality of lobes, one of said mechanisms being so axially positioned and having lobes of such radius that the paths of movement of the lobes and of said first and second blocks intersect, the other of said mechanisms being so axially positioned and having lobes of such radius that the paths of movement of the lobes and of said third and fourth blocks intersect, and means for resisting but not preventing rotation of each of said locking mechanisms.

12. A multiturn stop, comprising, a first gear, two auxiliary gears axially spaced apart from and positioned on opposite sides of said first gear, said gears being mounted for independent rotation about a common axis, a shaft parallel to and displaced from said common axis by a distance greater than the radius of any of said gears, a first pinion fastened to said shaft and meshing with said first gear, two auxiliary pinions fastened to said shaft and each meshing with one of said auxiliary gears, one of said auxiliary pinions being releasably fastened to said shaft whereby the angular position of one of said auxiliary gears with respect to the other auxiliary gear and said first gear may be adjusted, the ratios among said pinions and said gears being selected so that as said first gear is rotated one of said auxiliary gears rotates faster while the other of said auxiliary gears rotates slower, first and second blocks fastened to opposite sides of said first gear, said blocks extending toward but not touching said auxiliary gears, third and fourth blocks each fastened to that side of one of said auxiliary gears which is adjacent to said first gear, all of said blocks being at substantially the same radial distance from said common axis, two multilobed star wheels rotatably mounted on an axis parallel to but displaced from said common axis by a distance greater than the radius of any of said gears, each of said star wheels having a plurality of lobes, one of said star wheels being so axially positioned and having lobes of such radius that the paths of movement of the lobes and of said first and third blocks intersect, the other of said star wheels being so axially positioned and having lobes of such radius that the paths of movement of the lobes and of said second and fourth blocks intersect, and means for resisting but not preventing rotation of each of said star wheels.

13. Apparatus according to claim 12 in which said last named means comprises spring means independently urging each of said star wheels to a predetermined angular position.

14. A multiturn stop, comprising, a first gear, two auxiliary gears of substantially the same diameter as said first gear axially spaced from and positioned on opposite sides of said first gear, all three of said gears being mounted for independent rotation about a common axis, a shaft parallel to and displaced from said common axis by a distance greater than the radius of said gears, a first pinion fastened to said shaft and meshing with said first gear, two auxiliary pinions fastened to said shaft each meshing with one of said auxiliary gears, one of said pinions being releasably fastened to said shaft whereby the angular position of one of said auxiliary gears with respect to the other auxiliary gear and said first gear may be adjusted, one of said auxiliary gears having more teeth and the other auxiliary gear having fewer teeth than said first gear, all of said pinions having the same number of teeth, first and second blocks fastened to opposite sides of said first gear, said blocks extending toward but not touching said auxiliary gears, third and fourth blocks each fastened to that side of one of said auxiliary gears which is adjacent to said first gear, all of said blocks being at substantially the same radial distance from said common axis, two multilobed star wheels rotatably mounted on said shaft on either side of said first pinion, each of said star wheels having a plurality of lobes of such radius that the paths of movement of the lobes of one intersect the paths of movement of said first and third blocks while the paths of movement of the lobes of the other intersect the paths of movement of said second and fourth blocks, and means for resisting but not preventing rotation of each of said star wheels.

15. Apparatus according to claim 14 in which said last named means comprises spring means independently urging each of said star wheels to a predetermined angular position.

16. A multiturn stop, comprising, first and second gears mounted for independent rotation about a common axis, gear means mechanically interconnecting said first and second gears with a gear ratio such that rotation of said first gear causes said second gear to rotate at a different rate, first and second blocks mounted on the same side of said first gear, a third block mounted on one side of said second gear, all of said blocks being mounted at substantially the same distance from said common axis, means for mounting said second block at any of a plurality of angular positions on said first gear, and multilobed locking means pivotally mounted on an axis parellel to said common axis and displaced therefrom by a distance greater than the radius of either of said first or second gears, said locking means having a plurality of lobes axially positioned and of such radius that said lobes extend into the paths of movement of said blocks as said blocks and gears rotate.

17. A multiturn stop, comprising, first and second gears axially spaced apart and mounted to be independently rotatable about a common axis, gear means mechanically interconnecting said first and second gears, the gear ratios among said gear means and said first and second gears being selected so that rotation of said first gear causes said second gear to rotate at a different rate, a multilobed star wheel mounted for rotation about an axis parallel to said common axis and displaced therefrom by a distance greater than the radius of either of said gears, said star wheel being so axially positioned and the lobes thereof being of such radius that said lobes extend between facing sides of said first and second gears, first and second blocks fastened to that side of said first gear which is adjacent to said second gear, means for fastening said second block at any of a plurality of angular positions on said first gear, a third block fastened to said second gear on that side which is adjacent to said first gear, all three of said blocks being positioned at substantially the same radial distance from said common axis, the axial thickness of said blocks, the thickness of said lobes of said star wheel, the radial positioning of said blocks and the radius of said lobes being selected so that the paths of movement of said blocks and said lobes intersect, and means for resisting but not preventing rotation of said star wheel.

18. A multiturn stop, comprising, a first shaft, a first gear fastened to and rotatable with said first shaft, a second gear having substantially the same diameter as said first gear and mounted to be freely rotatable about said first shaft, said gears being axially spaced apart, said gears having different numbers of teeth, a second shaft parallel to said first shaft, a pinion mounted on said second shaft and meshing with both said first and second gears, first and second blocks mounted on said first and second gears respectively on that side of each which is adjacent to the other, said blocks being at substantially the same distance from said first shaft, said blocks each extending toward but not touching the other gear, a third shaft parallel to said first shaft, a multilobed star wheel mounted on said third shaft, said star wheel being axially positioned between said first and second gears and each lobe having such a radius that it extends into the path of movement of said of said blocks and said gears rotate, and means for resisting but not preventing rotation of said star wheel.

19. Apparatus according to claim 18 in which said last named means comprises means frictionally engaging said star wheel.

20. A multiturn stop, comprising, first and second gears axially spaced apart and mounted for rotation independently of each other about a common axis, gear means mechanically interconnecting said gears with a ratio such that rotation of said first gear causes said second gear to rotate at a different rate, said first gear having a radial groove formed on that side which is adjacent to said second gear, a first block positioned between said gears, a first projection on said block mating with said groove whereby as said first gear rotates said block rotates therewith and may move radially, said second gear having a spiral groove formed in that side which is adjacent to said first gear, a second projection on said block mating with said spiral groove, whereby as said first and second gears rotate at different rates said block moves radially with respect to said first gear and along said spiral groove in said second gear, a second block fastened to that side of said second gear which is adjacent to said first gear, said second block being positioned adjacent to the outer end of said spiral groove, and a multilobed locking means mounted for rotation about an axis parallel to said common axis and displaced therefrom by a distance greater than the radius of said gears, said locking means being so axially positioned and the lobes thereof being of said radius that said lobes extend between said gears into a portion of the paths of movement of said blocks.

21. A multiturn stop, comprising, a first gear, two auxiliary gears axially spaced apart from and positioned on opposite sides of said first gear, said gears being of substantially the same diameter and mounted for rotation independently of each other about a common axis, a shaft parallel to and displaced from said common axis by a distance greater than the radius of said gears, a first pinion fastened to said shaft and meshing with said first gear, two auxiliary pinions fastened to said shaft each meshing with one of said auxiliary gears, one of said auxiliary pinions being releasably fastened to said shaft whereby the angular position of one of said auxiliary gears with respect to the other auxiliary gear and said first gear may be adjusted, the ratio among said gears and pinions being selected so that said first gear rotates at a rate different from that of either of said auxiliary gears, said first gear having first and second radial grooves formed on opposite sides thereof, each of said auxiliary gears having a spiral groove formed on that side which is adjacent to said first gear, first and second blocks positioned on opposite sides of said first gear in the spaces between said first gear and said auxiliary gears, two projections on each of said blocks one mating with one of said radial grooves and the other mating with one of said spiral grooves, third and fourth blocks each fastened to one of said auxiliary gears on the side adjacent to said first gear and positioned near the outer ends of said spiral grooves, the direction of spiraling of said spiral grooves being selected in conjunction with the direction of rotation of each of said auxiliary gears with respect to said first gear to cause said first block to move radially outward as said second block moves radially inward and vice versa, and two multilobed star wheels each rotatably mounted on an axis parallel to but displaced from said common axis by a distance greater than the radius of said gears, said star wheels being axially positioned with the lobes of one extending into the space between said first gear and one of said auxiliary gears and the lobes of the other extending into the space between said first gear and the other of said auxiliary gears, the lobes being of such radius that they intersect a portion of the paths of movement of said blocks.

22. A multiturn stop, comprising, a first gear having first and second radial grooves formed on opposite sides thereof, second and third gears identical to each other each having a spiral groove formed on one side thereof, said second and third gears each having the same number of teeth which number is different from the number of teeth on said first gear, all three of said gears having substantially the same diameter, means for mounting said gears in spaced apart relation for independent rotation about a common axis with the spiral grooves of said second and third gears facing the radial grooves of said first gear, a shaft, first, second and third pinions having the same number of teeth fastened to said shaft for unitary rotation and meshing with said first, second and third gears respectively, said second pinion being releasably fastened to said shaft whereby the angular position of said second gear with respect to said first and third gears may be adjusted, first and second blocks positioned between said first and second gears and between said first and third gears respectively, each of said blocks having first and second projections on opposite sides thereof one mating with one of said radial grooves and one mating with one of said spiral grooves, third and fourth blocks fastened to said second and third gears respectively adjacent to the outer ends of said spiral grooves, and two multilobed star wheels each rotatably mounted on an axis parallel to but displaced from said common axis by a distance greater than the radius of said gears, said star wheels being axially positioned with the lobes of one extending between said first and second gears and the lobes of the other extending between said first and third gears, the lobes being of such radius that they intersect a portion of the paths of movement of said blocks.

References Cited in the file of this patent

UNITED STATES PATENTS

| | | |
|---|---|---|
| 985,221 | Spear | Feb. 28, 1911 |
| 1,203,840 | Barley | Nov. 7, 1916 |
| 1,795,420 | Beall | Mar. 10, 1931 |
| 2,464,584 | Kesselring | Mar. 15, 1949 |
| 2,496,455 | Elliott | Feb. 7, 1950 |
| 2,496,456 | Elliott | Feb. 7, 1950 |
| 2,688,882 | Alexy | Sept. 14, 1954 |
| 2,709,220 | Spector | May 24, 1955 |
| 2,744,416 | Feigin | May 8, 1956 |
| 2,746,573 | Hastings | May 22, 1956 |
| 2,823,561 | Opocensky | Feb. 18, 1958 |
| 2,902,876 | Pollock | Sept. 8, 1959 |
| 2,942,482 | Liggett et al. | June 28, 1960 |
| 3,012,447 | Wallace | Dec. 12, 1961 |

FOREIGN PATENTS

| | | |
|---|---|---|
| 126,785 | Germany | Jan. 11, 1902 |